United States Patent [19]
Andersen et al.

[11] Patent Number: 4,892,748
[45] Date of Patent: Jan. 9, 1990

[54] LOW CALORIE PET TREAT

[75] Inventors: David A. Andersen, Long Beach; Richard L. Harpe, Huntington Beach, both of Calif.

[73] Assignees: David Piatt & Associates, Woodland Hills; Wescotek, Inc., Long Beach, both of Calif.

[21] Appl. No.: 208,653

[22] Filed: Jun. 20, 1988

[51] Int. Cl.$^4$ ............................................. A23K 1/00
[52] U.S. Cl. ..................... 426/635; 426/72; 426/74; 426/634; 426/646; 426/805; 426/804
[58] Field of Search ............... 426/74, 635, 805, 804, 426/72, 623, 630, 635, 807

[56] References Cited

U.S. PATENT DOCUMENTS

| | | | |
|---|---|---|---|
| 3,023,104 | 2/1962 | Battista | 426/804 |
| 3,676,150 | 7/1972 | Glicksman | 426/804 |
| 4,109,018 | 8/1978 | Thompson | 426/804 |
| 4,735,808 | 4/1988 | Scaglione et al. | 426/805 |

OTHER PUBLICATIONS

Hawley "The Condensed Chemical Dictionary" Van Nostrand Reinhold Co., 10th Edition (1982) pp. 209-210 & 673.

Whistler et al., "Industrial Gums" Academic Press 1973 pp, 61914 627.

*Primary Examiner*—R. B. Penland
*Attorney, Agent, or Firm*—Ellsworth R. Roston; Charles H. Schwartz

[57] ABSTRACT

A low calorie dog treat is composed of food grade cellulose, a unique binder system holding the matrix, a combination of various color and flavor ingredients, and salt. The product contains only a few calories and can be consumed in large quantities by a dog without contributing to an obesity problem. The product is designed to compete with existing pet treats such as dog jerky, biscuits and bone shaped treats, and it is preferably amenable for use as a very few calorie pet food. The reduced number of calories in the dog treat is related to the fact that the cellulose material is composed primarily of fiber and therefore is not digested by the dog. The gum or binder system used in the formulation is also non-caloric. The product is produced by using existing processing equipment or by adapting such equipment relatively easily to applicants' methods. The product is produced by a process that is novel and that uniquely provides unexpected results in solidifying a mixture with a high amount of food grade cellulose.

4 Claims, No Drawings

LOW CALORIE PET TREAT

This invention relates to a new form of dog treat and more particularly to a new form of dog treat with as much as ninety percent (90%) less calories than any existing treats now being marketed in the U.S.A. The invention also relates to the methodology of producing such a dog treat.

STATE OF THE ART

There are only a relatively few dog treats on the market. The dog treats currently available on the market such as jerky, biscuits and bone type products are not formulated to provide a reduced number of calories. Products such as jerky are formulated to achieve high palatability but they contain high levels of animal fat. This causes a high number of calories to be consumed by the dog per weight of treat consumed. Likewise, the biscuits and bone types of products are also not formulated with ingredients providing reduced calories. They are positioned as a treat item from a palatability standpoint and also with a crunchy texture to facilitate the cleaning of the dog's teeth.

Another type of dog treat product currently on the market is based on rawhide. Since rawhide is chemically composed of an undigestible material having a collagen base, it is non-caloric and accordingly contributes few calories. Rawhide, however, is designed to be more of a toy than a food and many dogs, after chewing on rawhide for a short period of time, will lose interest in the item. Some manufacturers have attempted to solve this problem by extruding flavor components on the inside of the chopped rawhide during the manufacturing step. Such treats or toys made by this method incorporate calories into the item nad therefore result in a final product that can add significant calories if consumed in any quantity.

Although there are presently reduced diet dog foods on the market, they are specially formulated to provide balanced rations. Almost all are canned and sold for very high prices through veterinarians and pet store marketing outlets. These products are formulated with low fat levels but still contain a large number of calories because of the protein and carbohydrate fractions present. Although products of this type are quite satisfactory for supplying a dog's main ration, they are not adaptable as a treat type of offering.

BRIEF DESCRIPTION OF THIS INVENTION

The product of this invention is a very low calorie dog treat. The treat is composed of a food grade cellulose, flavoring in the form of artificial types of beef or in the form of dehydrated animal protein powders, a unique gum system of a type known as methylcellulose, artificial or natural colors and trace ingredients such as salt, minerals and vitamins. One acceptable product had dimensions of approximately 2¼"×1"×3/16". Each treat may weigh approximately four (4) grams. The size may be chosen to correspond to a desired weight-to-calorie ratio. A bone shaped die was used for convenience.

In one embodiment of the invention, a low calorie dog treat is composed of food grade cellulose, a unique binder system holding the matrix, and a combination of various color and flavor ingredients including salt. The product contains only a few calories and can be consumed in large quantities by a dog without contributing to an obesity problem. The product is designed to compete with existing pet treats such as dog jerky, biscuits and bone shaped treats. The product of this invention also can be configured as a dry pet food to be fed as a food to a pet such as a dog to reduce the dog's normal meal time calorie intake.

The reduced number of calories in the dog treat is related to the fact that the cellulose material is composed primarily of fiber and therefore is not digested by the dog. The gum or binder system used in the formulation is also non-caloric. The product is produced by using existing processing equipment or by adapting such equipment relatively easily to applicants' methods. The product is produced by a process that is novel and that provides unexpected results in solidifying a mixture with a high amount of food grade cellulose.

DETAILED DESCRIPTION OF THIS INVENTION

The major component ingredients of this formulation and the approximate median percentage of these ingredients in a finished product are illustratively shown below:

| Components | Approximate Median Percentage By Weight |
| --- | --- |
| Food Grade Cellulose | 72.0 |
| Animal Digest or Meal | 11.0 |
| Soy Grits | 10.0 |
| Methylcellulose Gum | 3.8 |
| Colors | 1.5 |
| Salt | 1.3 |
| Garlic Powder | 0.2 |
| Vitamins and Minerals | 0.2 |

A primary component of the product is the food grade cellulose. This product can be described by its chemical name beta-1,4-glucan, and it is nearly 100% crude fiber. Because of its high fiber level, it does not contribute nourishment in any way as it passes through the digestive track of monogastric animals. The starting material for the manufacture of this food grade cellulose is usually wood chips. Additional information concerning this product is provided in an article entitled "Cellulose; The Versatile Dietary Fiber" and published on pages 645-649 of *Cereal Foods World* in Volume 23, Number 11, in November, 1978. Information concerning this material is also disclosed in a product information bulletin published by the Designed Product Department of the Dow Chemical Company of Midland, Michigan, with the title "Methocel."

A second primary component in the treat formulation may be an animal digest or meal that is utilized as a flavor and protein source. The major component of both dry dog foods and bone type products may be poultry meal or meat meal or their liquid counterparts known as meat or poultry digest. These ingredients may be utilized in nearly all pet foods and may be made by dehydrating the residual material from poultry, beef or pork slaughtering operations.

Additional nutritive value may be present in the form of soy grits. The soy grits may be added for the purpose of improving the appearance of the product. The cellulose material is very white and homogeneous in color and shape and produces a product having a somewhat synthetic appearance. The use of a small quantity of soy grits eliminates the synthetic appearance of the product.

A gum system in the form of methylcellulose gum is utilized to bind the different ingredients. The particular type of cellulose gum utilized in this product is important to this invention since applicants have found that it may be impossible to bind the different ingredients without the use of this material. It should be noted that this material is not an obvious choice. Detailed information on the particular cellulose gum used is provided below. In addition to the above components, an optimal formula may also include natural or artificial colors, salt, additional flavoring such as garlic powder or onion powder and, if desired, vitamin and mineral supplementation.

BACKGROUND ON METHOCEL A4M METHYLCELLULOSE

To facilitate the reduction to practice of this invention, applicants required a binder or food grade gum system capable of binding the high cellulose level in this product. The difficulty is related to the fact that the powdered cellulose is inert and does not function in any way as a binder of its own. Applicants found, during the course of their experimentation, that the normal gums utilized to bind this type of product (such as food grade starches, locust bean gum, wheat gluten and similar products) was ineffective in binding the high level of cellulose present in their product.

The specific product found to be satisfactory for this application is Methocel A4M Methylcellulose manufactured by Dow Chemical Company of Midland, Michigan. This product is manufactured by reacting cellulose with methylchloride in the presence of caustic soda, thereby producing cellulose ether. This product is currently utilized in the food industry as thickeners and emulsifiers in sauces such as salad dressings, barbecue sauces and various types of puddings. The product is also used in jams and jellies for preventing syneresis and, to some extent, in canned pet foods for providing emulsion stability and thickening gravy, but never as a cellulose binder. In current food uses for Methocel A4M Methylcellulose, the products are utilized in an aqueous system but not as a binder for a final dried product as in applicants' product.

Applicants believe that the gum discussed in the previous paragraph is beneficial for their application because it is different in at least one important respect from the majority of food grade gums and binders. This difference is that methocel, when heated, will thermally gel at a specific temperature. For Methocel A4M, this temperature is 50°-55° C. This inverse solubility, compared to that of other natural and synthetic gums, is the apparent reason that the material will bind the inert cellulose fibers. In their process, applicants create a gel system of the formulation during the heating and dehydration step. As the water is removed from the dog treat, the gel contracts slightly but maintains a matrix sufficient to bind the inert cellulose fibers.

The gelation can be explained by postulating that, during the dissolution process, the long thread-like polymer molecules are jacketed with layers of water molecules to increase the product bulk. These water molecules act as a lubricant, enabling the long cellulose ether chains to slide easily over one another and imparting to the solution the property of a smooth-pouring, viscous liquid. As the temperature increases, the viscosity initially decreases, the energy of these relatively loosely bound molecules increases and the outer layers of water molecules break away. When enough of the attached water molecules are driven away from the cellulose ether chains, the lubricating action is lost, the chains lock and the solution gels. A detailed description of the specific gum and the theory behind its binding nature is provided in the article entitled "Methocel Product Information" published by the Designed Products Department of the Dow Chemical Company of Midland, Michigan, in February, 1975.

PROCESS

The process used to manufacture applicants' low calorie pet treat differs from that used on many snack products in that a novel modification is required to properly solubilize the gum system. A dry blend is initially made of all the dry ingredients with the exception of the methylcellulose gum. This dry blend includes the food grade cellulose, the animal digest or meal, the soy grits when utilized, and any colors, flavors, salt, species, vitamins or minerals in the formulation.

The mix is preferably performed in a dough type of mixer which is normally utilized for cookie or snack food doughs. To facilitate the formation of the product into the desired food or treat shape, water is added to the dry powders to produce a doughy consistency. The water is preferably in a ratio by weight of about fifty five percent (55%) water to about forty five percent (45%) dry blended ingredients. Approximately one third ($\frac{1}{3}$) of such water is heated to a temperature of at least 90° C. and the methylcellulose gum is solubilized in such water. A high speed Lightning type of mixer is preferably used to solubilize the cellulose gum into this hot water. This actually disperses each individual particle of methylcellulose gum, which begins to wet out and swell while at the same time enhancing viscosity.

After the methylcellullose gel is dispersed, the remainder of the water is added as cold water with continued agitation. This water-methylcellulose gum mixture is then pumped into a dough mixer and mixed with the dry blended ingredients. The mixing continues until all of the liquid phase has been distributed into the dry components. At this time, the mixture will resemble a typical bread or bakery dough.

The product is then formed on a typical dough molding equipment known as a rotary dough molder. Such equipment typically used in the industry and suitable for the formation of this product may be obtained from the Weidenmiller Company of Morton Grove, Illinois. In the operation of this equipment, the dough is fed from the top via a hopper into cavities which are machined into the outer circumference of a drum. These cavities are shaped in the mirror image of the desired shape. As the drum slowly rotates, the dough is forced into the cavities at the top of the drum and is then ejected onto a conveyor belt when the drum reaches the down position. The cavities (or die) can be designed to manufacture any dog treat shape desired. For example, the end product can be round, square or bone shaped. It should be noted that applicants' product formulation also can be extruded in any of a variety of shapes and weights.

In their experimentation, applicants have found that the gum used for their product is stickier than that used for most types of bakery or pet food doughs. Teflon dies may be used. Because of their smooth finish, Teflon dies eliminate the sticking of material to the inside of the cavity. Teflon dies have been used in the past with high sugar confectionery types of products such as licorice, marshmellows or jellied candies, but they have not been used for standard cookie and cracker applications.

Applicants' product also differs considerably from normal bakery doughs in that most doughs are molded at approximately thirty five percent (35%) moisture. Because of the ability of the food grade cellulose to hold large amounts of water, applicants have found it beneficial to mold this product at approximately fifty five percent (55%) moisture. The conveyor belt then takes the product from the molder through an oven and dryer to dehydrate the product to approximately a ten percent (10%) moisture.

Since all of the individual components of the matrix are already cooked or gelatinized, it is not necessary to reach any specific temperature in the oven or dryer. Rather, it is desirable to subject the product to enough heat and air velocity to reduce the moisture content from an initial amount of approximately fifty five percent (55%) to a final amount of approximately ten percent (10%).

In the dryer, the gum system is cured by the thermal gelatinization mechanism discussed previously and the matrix is bound by this dehydrated gum system. When the product leaves the dryer, it is then cooled and ready for packaging.

Alternatively, a coating of a highly palatable gravy may be sprayed on the product. This is typically done in many dry dog foods and dry pet food treats for palatability enhancement. It is suggested here as a simple means to achieve enhanced palatability with a slight concomitant increase in the caloric level.

RANGES OF INGREDIENTS AND SUBSTITUTIONS

Listed below are the practical ranges for each of the major components of applicants' proposed formulation:

| Ingredient | Percentage Range By Weight |
| --- | --- |
| Food Grade Cellulose | 25–90 |
| Animal Digest or Meal | 5–50 |
| Soy Grit | 0–15 |
| Methycellulose Gum | 1–5 |
| Color | 0–5 |
| Salt | 0–2 |
| Garlic Powder | 0–1 |
| Vitamins & Minerals | 0–2 |

The major component of the formulation is the food grade cellulose. At a level of food grade cellulose below approximately twenty five percent (25%) by weight, the caloric value of the other ingredients in the treat would increase to the point of not being a marketable low calorie pet treat. At a level higher than ninety percent (90%) by weight, it is not now practical to bind the components of this formulation.

The level of the animal digest or meal also can vary widely by weight. A range of five percent to fifty percent (5–50%) is feasible. The animal digest or meal is a major component of the formulation in addition to the food grade cellulose. As the cellulose level increases by weight, the level of the animal digest or meal accordingly decreases by weight. Any protein or carbohydrate fraction normally utilized in a pet food ration can be used in place of the animal digest or meal without departing from the scope of the invention. These could include poultry meal, meat meal, liver meal, soy flour, ground corn, ground wheat, any dehydrated animal or vegetable by-product or any combination of the above.

The soy grit is present to improve the appearance of the product. Thus, a treat with all of the functional characteristics of applicants' product could be made without this component. However it would be difficult, at present, to bind a product with a grit level in excess of approximately fifteen percent (15%).

Below an amount of gum of approximately one percent (1%) by weight, there would not be sufficient methylcellulose gum to bind the matrix. Above approximately five percent (5%) by weight of methylcellulose gum, the product probably can not be formulated on current processing equipment.

Obviously, the color, salt, flavor, vitamins and minerals could be eliminated without affecting the ability to obtain a product within the scope of this invention. The maximum levels shown for all of these components are such that, if utilized at levels in excess of those specified, the product probably could not be manufactured satisfactorily on current molding equipment or would not be acceptable to dogs from a palatability standpoint.

The color in applicants' product can be any color including normal F.D. & C. colors approved for use in food. The color can be provided from materials such as iron oxide, natural carmel coloring or charcoal. The flavoring can be obtained from materials other than salt (sodium chloride) and garlic powder. For example, potassium chloride can be used instead of sodium chloride and other spices normally acceptable to dogs such as onion powder, or other spice extractives, can be used instead of garlic powder.

EXAMPLES:

A one thousand gram (1000 g.) batch of low calorie dog treat base was formulated by using the following ingredients and amounts:

| Example #1 | | |
| --- | --- | --- |
| Ingredient | Percentage | Grams |
| Water | 55.00 | 550 |
| Poultry Digest | 4.90 | 49 |
| Methylcellulose Gum A4M | 1.70 | 17 |
| 10% Red #40 Solution | 0.30 | 3 |
| Carmel Color | 0.30 | 3 |
| Salt | 0.60 | 6 |
| Garlic Powder | 0.20 | 2 |
| Food Grade Cellulose | 32.00 | 320 |
| Soy Grits | 5.00 | 50 |

Approximately one third (⅓) of the water in the formulation was heated to approximately 200° F. and the methylcellulose gum was distributed in this hot water. After the water was agitated for approximately three (3) minutes, the remaining water was added to the distributed gum at a temperature of approximately 70° F. under constant agitation. The remaining ingredients in the formulation were dry blended and placed in a Hobart mixer equipped with a dough hook. The water-methylcellulose gum solution was then added slowly to the dry powder under constant mixing. After all of the gum solution was added, the mixing was continued for approximately five (5) minutes to properly distribute all of the liquid phase and flavoring and coloring into the mixture.

The material was then compressed into Teflon coated dies in the shape of a bone approximately 2 ⅜" long × 1" wide × 3/16" thick. The formed bone-shaped treats were released from the die and dried in a hot air oven at approximately 180° F. for approximately thirty (30)

minutes until they reached a moisture level of approximately ten percent (10%) by weight. The dried bone-shaped treats were then sprayed with approximately one percent (1%) by weight of a natural smoke flavor to add a pleasant odor. As previously noted, the bone shaped die was chosen for convenience.

The bone-shaped treats were fed to a large number of over-weight dogs. The dogs readily consumed the treats. Laboratory analysis of the samples showed a caloric content of five tenths (0.5) calories/gram compared to five and two tenths (5.2) calories/gram for a commercial dog biscuit. A second test run was conducted by utilizing a dehydrated poultry by-product meal in place of the liquid poultry digest. In addition, the carmel color level was increased considerably to produce a final color similar to the majority of baked dog biscuits now on the market. The background flavor was also changed from the experiment in example #1 by utilizing brewers yeast as part of the flavor component. The dogs readily consumed these modified treats.

A second formulation was prepared as follows:

Example #2

| Ingredient | Percentage | Grams |
| --- | --- | --- |
| Water | 58.0 | 580 |
| Poultry by-product meal | 5.0 | 50 |
| Methylcellulose Gum A4M | 1.7 | 17 |
| Carmel Color | 3.0 | 30 |
| Salt | 0.6 | 6 |
| Brewers Yeast | 3.5 | 35 |
| Food Grade Cellulose | 27.9 | 279 |
| Vitamins-Mineral Supplement | 0.3 | 3 |

This second formulation was prepared by an identical method to that described under Example #1. The bone-shaped treats, after the drying step, had an appealing dark color similar to that of many existing pet treats. Laboratory analysis on this particular batch showed a caloric content of approximately fifty seven hundredths (0.57) calories/gram. This is significantly below the caloric content of existing pet food treats.

The formulas described in Examples 1 and 2 resulted in products with a caloric value respectively ninety percent (90%) and 89.0% less than the caloric value of most dog food snack products. The proper inclusion of ingredients enhancing palatability will then result in an end product that will be acceptable to all dogs except the most finicky. Varying the amount of palatability enhancers allows for the utilization of this type of product for even very finicky dogs, many of which tend to be small in size but still susceptible to overeating and gaining weight.

The formulations described above demonstrate that it is very easy and simple to increase the background flavor content to any level desired by the manufacturers of the product. The difference is that the flavor enhanced formulas described in Examples 1 and 2 above can be produced with a fifty percent (50%) to ninety percent (90%) reduction in caloric content beyond that of existing high calorie pet food treats.

A formulation for an intermediate low caloric snack meeting the criteria discussed in the previous paragraph is shown below as Example #3:

Example #3

| Ingredients | Percentage | Grams |
| --- | --- | --- |
| Water | 36.0 | 360 |
| Meat & Bone Meal | 15.0 | 150 |
| Liver Digest | 5.0 | 50 |
| Methylcellulose Gum A4M | 1.7 | 17 |
| Red Iron Oxide | 0.6 | 6 |
| Salt | 0.6 | 6 |
| Onion Powder | 0.8 | 8 |
| Wheat Flour | 10.0 | 100 |
| Deboned Beef | 10.0 | 100 |
| Vitamin-Mineral Supplement | 0.3 | 3 |
| Food Grade Cellulose | 20.0 | 200 |

The formulation shown in Example #3 was processed basically the same way as Example #1 with the following modifications. Because the liver digest is an acid stabilized product, it was neutralized with sodium hydroxide to a pH of approximately 6.0 prior to mixing with the other components. In addition, the flexibility of the formula is shown in this example by the utilization of fresh beef. Prior to addition to the matrix, the deboned beef in the formula was converted into a fine emulsion in a standard kitchen food processor. To reduce the mixing time, it was found that the iron oxide could be distributed in the gum-water mixture prior to mixing with the dry phase. Because of the wheat flour in the above formulation, the treats produced by this batch in the shape of bones were cooked in an oven at approximately 250° F. for about ten (10) minutes. The products were then dehydrated in the dryer to a final moisture content of approximately ten percent (10%).

The product described above has certain important advantages It provides a singularly low-caloric treat for a dog. The amount of calories in the product of this invention is as low as ninety percent (90%) less than the calories found in other dog treats now on the market. In spite of such a low number of calories, the product of this invention is clearly palatable to dogs. The product of this invention is further advantageous in that it can be produced on existing processing equipment or with existing processing equipment, all of which can be relatively easily adapted for use with applicants' methods. Furthermore, the product is produced by a method that is not known in the prior art and that provides unexpected results.

The discussion above has proceeded on the basis of a low calorie treat for dogs. It will be appreciated, however, that the low calorie treat may be palatable to other pets than dogs. Further, from a marketing standpoint, the formulation and process also can be utilized in the production of a reduced calorie dry pet food product.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. A method of making a low-calorie treat for pets, including the steps of:
   providing a base having the following ingredients in the following percentages by weight:

| Ingredient | Percentage Range by Weight |
| --- | --- |
| Water | 36.0–58.0 |

-continued

| Ingredient | Percentage Range by Weight |
|---|---|
| [Protein or Carbohydrate] By-product Selected from the Group Consisting of Proteins and Carbohydrates | 4.9–40.0 |
| Methylcellulose Gum | 1.0–5.0 |
| Color | 0.6–3.0 |
| Salt | 0.2–0.6 |
| Food grade Cellulose | 20.0–32.0 |
| Vitamins-mineral Supplement | 0–0.3 |
| Grits | 0–5 | heating approximately one third (⅓) of the water to about 200° F. and distributing the methylcellulose gum in the hot water;

agitating the remaining two thirds (⅔) of the water and adding this water to the distributed methylcellulose gum during such agitation at a temperature of about 70° F.;

dry blending the other ingredients; and adding the water solution of the methylcellulose gum slowly to the dry blend under constant mixing at a temperature of about 70° F.

2. A method as set forth in claim 1 wherein the mixture of the water solution of the methycellulose gum and the dry blend is compressed in a Teflon-coated die and dried in a hot air oven.

3. A method as set forth in claim 2 wherein the drying of the mixture in the hot air oven is at a temperature of approximately 180° F. until the mixture reaches a moisture level of approximately ten percent (10%).

4. A method as set forth in claim 3 wherein the low calorie treat for pets is sprayed with material providing a ordor pleasing to the smell of the pet after the low calorie treat is dried in the hot air oven.

* * * * *